United States Patent Office 2,741,571

Patented Apr. 10, 1956

2,741,571

METHOD OF BONDING METALS

Carl T. Chase, Wallingford, Pa., Morton J. Disckind, Chicago, Ill., and Marshall D. Earle, Linthicum Heights, Md., assignors to the United States of America as represented by the Secretary of the Army No Drawing. Application June 19, 1953, Serial No. 362,956

6 Claims. (Cl. 148—4)

This invention relates to thermoelectric generators and more particularly to a method of constructing a joint between zinc-antimony and constantan having good mechanical strength and low resistivity.

It is well known in the art that when two different metals are joined together and the joint is heated, an electromotive force is developed. If the metals form a closed circuit, an electric current will flow therein. This is the basic principle utilized in thermocouples and thermopiles.

Thermocouples and thermopiles have been widely used to measure temperature and to detect and measure radiant energy. Their utility depends upon their simplicity as no more convenient method for generating electromotive force or electric current by the absorption of thermal energy is known. A thermoelectric generator has many advantages. It is quiet; it has no moving parts and thus requires no lubricant. Since the power conversion is direct, the generator is quite compact and it is very useful for unattended operation in remote locations.

Desirable properties in a thermoelectric generator include high thermoelectric power, high electrical conductivity and low thermal conductivity. In naturally occurring metals, high electrical conductivity is usually accompanied by high thermal conductivity with the result that excessive heat is lost by conduction. On the other hand, if the electrical conductivity is low, large voltage produces low electric current with excessive heat losses in the leads. Therefore, emphasis has been placed on research for alloys which give promise of sufficiently high efficiencies for practical use. An intermetallic compound of zinc and antimony is one such compound. The utility of this compound depends on correct heat treatment for unless the intermetallic compound is truly homogeneous, its thermoelectric power is low.

Development of thermoelectric generators using such intermetallic compounds have been retarded by the inability to make sufficiently good electrical connection to ingots of the material. Samples are generally cast from a melt and are moderately brittle as well as being subject to chemical attack. Many attempts at soldering have resulted in failure to wet the surface on the one hand or destruction of the ingot material on the other.

The value of the electromotive force developed by a thermocouple depends upon the temperature of the joint of the thermoelectric couple and the temperature of the remainder of the circuit. If the current derived from this electromotive force flows through an ammeter or galvanometer, the reading of the instrument will be proportional to the temperature at the joint. The electromotive force developed is quite small and to obtain efficient operation, it is necessary that the bond between the dissimilar metals or alloys comprising the thermocouple have low electrical resistance, high mechanical strength and stability in use at operating temperatures.

It is therefore an object of the present invention to provide a method for constructing a joint between dissimilar metals where these metals are of such a nature that they cannot be bonded by soldering, welding or brazing.

In accordance with the present invention, there is provided a method of constructing a joint having good mechanical strength and low resistance comprising intimately uniting a zinc-antimony and a constantan element to form a junction therebetween, applying a molten metal selected from the group consisting of constantan and copper to said junction and thereafter annealing said junction at a temperature of about 400° C.

For a better understanding of the invention, together with other and further objects thereof, reference is had to the following description and its scope will be pointed out in the appended claims.

It has been found from the present invention that a thermocouple consisting of a zinc-antimony and constantan is a relatively efficient thermoelectric generator. Heretofore, the difficulty in making such a thermocouple has been the inability to construct a joint between zinc-antimony and constantan which is strong mechanically, has low electrical resistance and does not deteriorate with time. Constantan cannot be bonded to a zinc-antimony element by the usual soldering, welding or brazing techniques.

The present invention provides a method of bonding zinc-antimony element to a constantan strip by means of a constantan spray. In carrying out the present invention, a hole approximately ½ inch in diameter is drilled in the constantan strip through which an ingot of zinc-antimony having a diameter of ½ inch is forced, the ingot protruding about 1⁄16 inch on one side. The constantan and slightly extended zinc-antimony surface is sandblasted and then sprayed with molten constantan or copper by means of a spray gun or other suitable means. It is necessary that during the spraying, the molten constantan be kept at a temperature below the melting point of the zinc-antimony element upon striking it or the joint being formed will break easily or oxidize. The joint as formed is mechanically weak and shows an initial resistance of 0.002 ohm.

The joint is now annealed for several days at a temperature of 350° to 450° C., a preferred method being to anneal it at about 400° C. for about four days. Annealing of the joint at an elevated temperature permits diffusion to occur across the interface thereby reducing its resistivity and greatly increasing its mechanical strength. The joint which is the present invention, when so annealed, shows a drop in resistance to about 0.0005 ohm or less and its mechanical strength is excellent.

While there have been described what are at present considered to be preferred embodiments of the invention, it will be obvious to those skilled in the art that various changes and modifications may be made therein without departing from the invention and it is, therefore, aimed in the appended claims to cover all such changes and modifications as fall within the true spirit and scope of the invention.

What is claimed:

1. In a thermoelectric generator, a method of constructing a joint having good mechanical strength and low resistance comprising intimately uniting a zinc-antimony and a constantan element to form a junction therebetween, spraying said junction with molten constantan, said spray material being applied to said junction at a temperature lower than the melting point of said zinc-antimony element, and annealing said sprayed junction at a temperature of about 350° C. to 450° C. for several days.

2. In a thermoelectric generator, a method of constructing a joint having good mechanical strength and low resistance comprising intimately uniting a zinc-antimony and a constantan element to form a junction therebetween, spraying said junction with a molten material selected from the group consisting of constantan and copper, said spray material being applied to said junction at a temperature lower than the melting point of said zinc-antimony element, and annealing said sprayed junction at a temperature of about 350° to 450° C. for several days.

3. In a thermoelectric generator, a method of constructing a joint having good mechanical strength and low resistance comprising intimately uniting a zinc-antimony and a constantan element to form a junction therebetween spraying said junction with a molten material selected from the group consisting of constantan and copper, said spray material being applied to said junction at a temperature lower than the melting point of said zinc-antimony element, and annealing said sprayed junction at a temperature of about 400° C. for about four days.

4. In a thermoelectric generator, a method of constructing a joint having good mechanical strength and low resistance comprising intimately uniting a zinc-antimony and a constantan element to form a junction therebetween, spraying said junction with molten constantan, said spray material being applied to said junction at a temperature lower than the melting point of said zinc-antimony, element, and annealing said sprayed junction at a temperature of about 400° C. for about four days.

5. In a thermoelectric generator, a method of constructing a joint having good mechanical strength and low resistance comprising intimately uniting a zinc-antimony and a constantan element to form a junction therebetween, spraying said junction with molten copper, said spray material being applied to said junction at a temperature lower than the melting point of said zinc-antimony element, and annealing said sprayed junction at a temperature of about 400° C. for about four days.

6. In a thermoelectric generator, a method of constructing a joint having good mechanical strength and low resistance comprising intimately uniting a zinc-antimony and a constantan element to form a junction therebetween, spraying said junction with molten copper, said spray material being applied to said junction at a temperature lower than the melting point of said zinc-antimony element, and annealing said sprayed junction at a temperature of about 350–450° C. for several days.

References Cited in the file of this patent

UNITED STATES PATENTS

| | | |
|---|---|---|
| 1,412,656 | Jenkins | Apr. 11, 1922 |
| 2,381,819 | Graves | Aug. 7, 1945 |